United States Patent
Lou et al.

(10) Patent No.: US 11,184,799 B2
(45) Date of Patent: Nov. 23, 2021

(54) WIFI TCP PERFORMANCE IN MULTI-RADIO COEXISTENCE CASES

(71) Applicant: Apple Inc., Cupertino, CA (US)

(72) Inventors: Wenping Lou, San Jose, CA (US);
Camille Chen, Cupertino, CA (US);
Sudheer Konda, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 16/585,793

(22) Filed: Sep. 27, 2019

(65) Prior Publication Data

US 2020/0107222 A1 Apr. 2, 2020

Related U.S. Application Data

(60) Provisional application No. 62/737,209, filed on Sep. 27, 2018.

(51) Int. Cl.
| | |
|---|---|
| *H04L 29/08* | (2006.01) |
| *H04L 1/00* | (2006.01) |
| *H04W 28/06* | (2009.01) |
| *H04L 5/14* | (2006.01) |
| *H04W 76/10* | (2018.01) |
| *H04L 29/06* | (2006.01) |
| *H04W 84/12* | (2009.01) |

(52) U.S. Cl.
CPC ............... *H04W 28/06* (2013.01); *H04L 5/14* (2013.01); *H04L 69/161* (2013.01); *H04W 76/10* (2018.02); *H04W 84/12* (2013.01)

(58) Field of Classification Search
CPC ... H04L 29/08; H04L 1/00; H04L 5/00; H04L 29/06; H04L 1/18; H04L 12/26; H04L 12/28; H04L 12/801; H04L 9/06
See application file for complete search history.

(56) References Cited

U.S. PATENT DOCUMENTS

| | | | |
|---|---|---|---|
| 9,455,897 B2* | 9/2016 | Krishnaswamy | ..... H04L 69/165 |
| 2013/0019025 A1* | 1/2013 | Chaturvedi | ............ H04L 65/80 |
| | | | 709/231 |
| 2013/0195106 A1* | 8/2013 | Calmon | .................. H04L 69/14 |
| | | | 370/389 |
| 2017/0111819 A1* | 4/2017 | Bando | ............... H04W 28/0284 |
| 2019/0045388 A1* | 2/2019 | Zhang | ............... H04W 28/0284 |

* cited by examiner

*Primary Examiner* — Sai Aung
(74) *Attorney, Agent, or Firm* — Fay Kaplun & Marcin, LLP

(57) ABSTRACT

A method for handling received packets is described. The method includes receiving a packet over a wireless connection, determining whether the packet is received within a reordering window, the reordering window defining a window size to receive data, when the packet is received outside the reordering window, determining whether the packet is a transmission control protocol (TCP) packet and when the packet is a TCP packet, delivering the TCP packet to a TCP/Internet Protocol (IP) stack.

20 Claims, 5 Drawing Sheets

WIFI TCP PERFORMANCE IN MULTI-RADIO COEXISTENCE CASES

PRIORITY INFORMATION/INCORPORATION BY REFERENCE

This application claims priority to U.S. Provisional Application 62/737,209 entitled "Improved WiFi TCP Performance in Multi-Radio Coexistence Cases," filed on Sep. 27, 2018, the entirety of which is incorporated herein by reference.

BACKGROUND INFORMATION

A user equipment (UE) may be configured to establish a wireless connection to at least one of a plurality of different networks or types of networks as well as with other UEs to perform a variety of different functionalities via the wireless connection. For example, the UE may connect to a first type of network such as a cellular network (e.g., Long Term Evolution (LTE) network) to communicate with a further UE through the network connection (e.g., a user of the UE may perform a voice call or transmit a text to another user of another UE). In another example, the UE may connect to a second type of network such as a local area network (e.g., WiFi network) to exchange data with devices connected to further networks. In a further example, the UE may connect to a further UE in a peer-to-peer connection using a short-range communication connection (e.g., WiFi Direct, Ultra-Wideband (UWB), Bluetooth, etc.) to exchange data.

Common protocols used by wireless connections for network connections and peer-to-peer connections are Internet Protocol (IP) and/or Transmission Control Protocol (TCP), often used in combination. TCP provides a framework for data to be transmitted from a sender to a receiver through packetizing the data into an ordered sequence. Thus, when a sender transmits the packets to the receiver, the receiver is capable of processing the packets to reassemble the data as intended. Even when the packets are received out of order, TCP enables the packets to be reordered into the correct sequence for further processing (e.g., delivering the data to a requesting application existing on a higher layer).

TCP was created for a wired connection. As those skilled in the art will understand, wired connections experience significantly less connection interruptions than a wireless connection. TCP assumes that any packet loss in a wired connection is due to congestion and imposes a very aggressive penalty when congestion losses occur. However, when a wireless connection is used, there may be other reasons for packet losses in addition to congestion, e.g., multiple radio coexistence where a first wireless connection may be interfered by one or more second wireless connections. These non-congestion related packet losses typically have different characteristics than congestion packet loss. For example, the non-congestion packet loss is typically a burst packet loss (a short duration of several packets) or an individual packet loss. The very aggressive penalty that TCP imposes for packet loss reduces TCP performance in wireless scenarios but does not generally help with this type of packet loss that is associated with multiple radio coexistence. TCP has included some modifications to address issues that arise from wireless connections. For example, the reordering mechanism has at least partially compensated for uneven delivery of packets. However, the coexistence issue may cause the first wireless connection to be suspended or unavailable for TCP packet exchange. This may result in dropped packets, a prolonged delivery of data, data reception with errors, a poor user experience, etc.

SUMMARY

In one exemplary embodiment, a method is described that includes receiving a packet over a wireless connection, determining whether the packet is received within a reordering window, the reordering window defining a window size to receive data, when the packet is received outside the reordering window, determining whether the packet is a transmission control protocol (TCP) packet and when the packet is a TCP packet, delivering the TCP packet to a TCP/Internet Protocol (IP) stack.

In another exemplary embodiment, a further method performed by a first device configured to establish a wireless connection with a second device is described. The method includes transmitting a transmission control protocol (TCP) packet to the second device, determining whether a retransmission timeout duration for the TCP packet has expired, when the retransmission timeout duration has expired, determining a type of the wireless connection, when the wireless connection comprises a WiFi infrastructure connection, selecting first settings including restarting a slow start and reducing a congestion window by a first amount, the congestion window being set by the first device to define a data rate based on congestion in the wireless connection and when the wireless connection comprises a WiFi peer-to-peer (P2P) connection, selecting second settings including reducing a congestion window by a second amount, less than the first amount, and omitting a restart of the slow start.

In a still further exemplary embodiment, a device having a transceiver and a processor is described. The transceiver is configured to establish a wireless connection, the transceiver receiving a packet over the wireless connection. The processor is configured to determine whether the packet is received within a reordering window, the reordering window defining a window size to receive data. The processor is further configured to, when the packet is received outside the reordering window, determine whether the packet is a transmission control protocol (TCP) packet and, when the packet is a TCP packet, deliver the TCP packet to a TCP/Internet Protocol (IP) stack.

DETAILED DESCRIPTION

Figure 1:
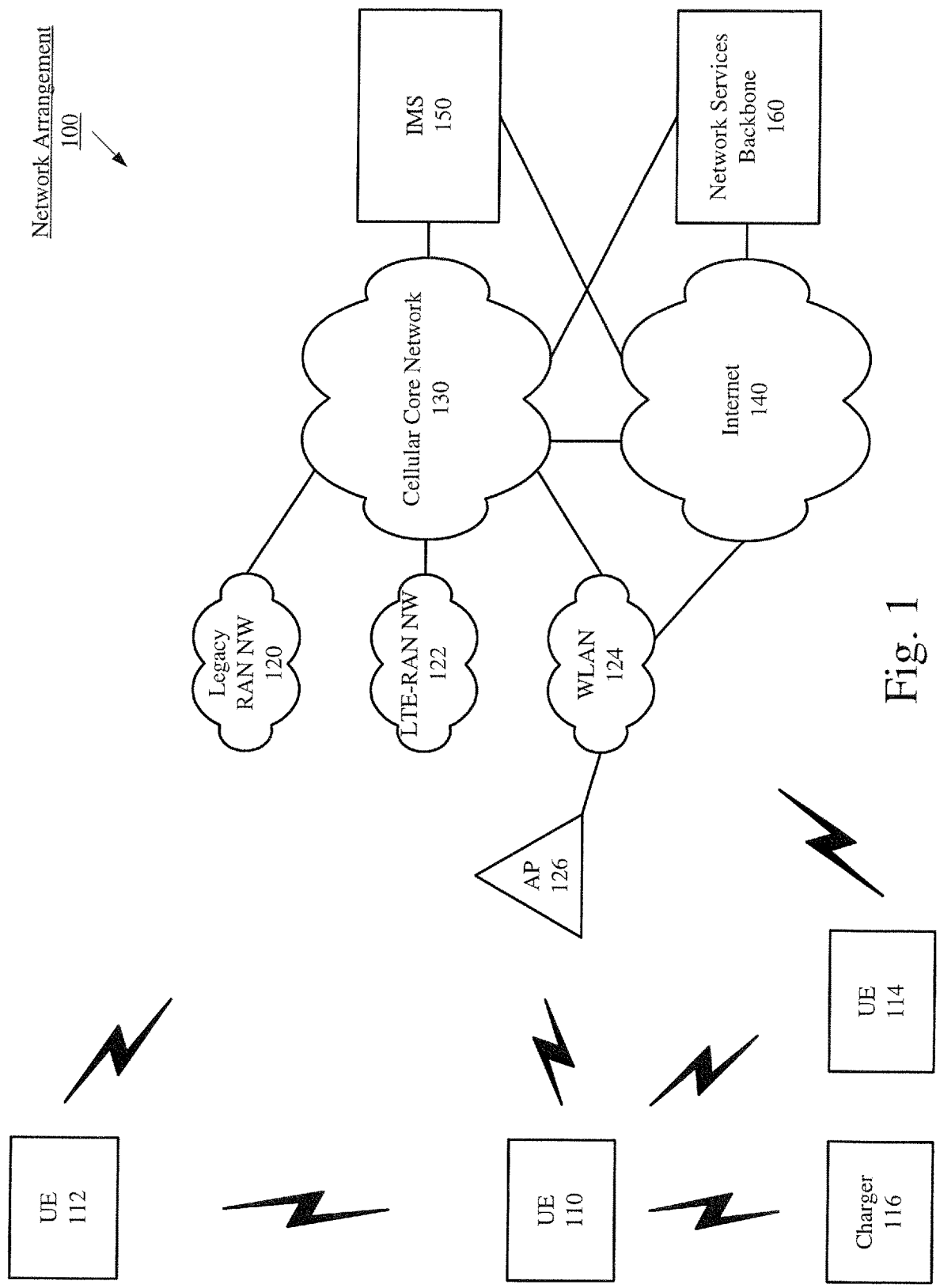
FIG. 1 an exemplary network arrangement according to various exemplary embodiments described herein.

The exemplary embodiments may be further understood with reference to the following description and the related appended drawings, wherein like elements are provided with the same reference numerals. The exemplary embodiments are related to devices, systems, and methods to improve performance of a Transmission Control Protocol (TCP) for a wireless connection established by a user equipment (UE). The exemplary embodiments provide mechanisms that address interruptions in the wireless connection, particularly due to coexistence cases where one or more further wireless connections may temporarily suspend the wireless connection. The exemplary embodiments provide a plurality of mechanisms to more efficiently utilize TCP. A first mechanism provides a more robust processing of received TCP packets. A second mechanism dynamically establishes one or more settings for the wireless connection. A third mechanism aligns timing windows for the wireless connection. Each of the exemplary mechanisms will be described in detail below.

Initially, the exemplary embodiments are described with regard to a UK. However, the UE is only exemplary. The exemplary embodiments may be utilized with any device that may establish a wireless connection utilizing TCP as well as be configured with the hardware, software, and/or firmware to establish the wireless connection and utilize the mechanisms according to the exemplary embodiments. Therefore, the UE as described herein is used to represent any device capable of establishing the wireless connection.

The exemplary embodiments are described with regard to wireless connections utilizing TCP. However, the use of TCP is only exemplary. The exemplary embodiments may be implemented and/or modified with any wireless connection that utilizes a transmission process or protocol that shares some or all of the characteristics of TCP. For example, these characteristics include a sequencing order of packets with corresponding operations imposed when the sequence becomes broken, when a response is not received, when timeframes are used for expected operations, etc.

The exemplary embodiments are described with regard to the wireless connection being a WiFi connection. As will be described below, the WiFi connection may be subject to coexistence cases in which other wireless connections may cause the WiFi connection to be suspended or interrupted (e.g., the other wireless connections are "always on", periodically on, have priority, low latency packets, critical packets, ranging packets, etc.). However, the use of the WiFi connection is only exemplary and the exemplary embodiments may be utilized and/or modified to be used with other types of wireless connections.

The exemplary embodiments are directed to mechanisms that may be used with a wireless connection, e.g., WiFi, in which data is delivered from a sender to a receiver using a TCP process where the data is transmitted as an ordered sequence of packets. The exemplary embodiments are further directed to address various issues that arise from using the TCP process for an exchange of data over the wireless WiFi connection between an access point of a WiFi network and a UE (hereinafter referred to as "WiFi infra connection"), over the wireless WiFi connection between the UE and another UE (hereinafter referred to as "WiFi P2P connection"), or over a plurality of WiFi infra connections for respective UEs. As the WiFi connection may experience interference and coexistence cases with other wireless connections, the exemplary embodiments enable use of the mechanisms for greater tolerance in received packets, less aggressive fallback positions, and better timed use of the WiFi connection.

In a multiple radio coexistence case in which multiple wireless radios of a UE are propagating signals, the WiFi connection may be temporarily suspended. For example, the WiFi connection may have a lower priority than the other wireless connections such that the WiFi connection is suspended while the other wireless connections are used. In one example, a BlueTooth connection may be in an "always on" state that prevents the BlueTooth connection from being suspended. In another example, the WiFi connection and the other wireless connections may be used in a turn-based schedule.

The WiFi connection may also be suspended due to other considerations. In a first example, the WiFi connection may be suspended due to a radio switch when the radio is configured for a plurality of different types of wireless connections. For example, the radio switch may be for a spectrum overlap between the WiFi network and another wireless network. In another example, the radio switch may be for a shared antenna that is used for multiple wireless networks including the WiFi network.

In a second example, the WiFi connection may be suspended due to a specific absorption rate (SAR) limitation. Independent of or in combination with the suspension, the SAR limitation may also reduce a transmit power for the WiFi connection. The SAR limitations may be, for example, for a combination of a simultaneous dual band WiFi connection (e.g., at 2.4 GHz and 5 GHz), for a combination of the WiFi infra connections and/or the WiFi P2P connection with a cellular connection, for a combination of the WiFi infra connection and/or the WiFi P2P connection with the UWB connection, for a combination of the WiFi infra connections and/or the WiFi P2P connection with a wireless charging connection, etc.

When the WiFi connection (e.g., the WiFi infra connection, the WiFi P2P connection, etc.) is temporarily suspended, the TCP traffic performance may be impacted. For example, a TCP timeout may occur in which a TCP connection is shut down for a reconnection to the TCP layer. The TCP timeout may extend a time needed for data to be exchanged from a sender to a receiver. The TCP traffic over the WiFi connection is also receiver-centric. Therefore, user experience may be negatively impacted due to the multiple radio coexistence issue, particularly in view of the resulting suspension.

The suspension of the WiFi connection may also affect other aspects of the wireless connection including the TCP process. In a first example, those skilled in the art will understand that a conventional use of the WiFi connection and exchange of packets using the TCP includes a response of an ACK or a NACK for each packet. The response is implemented by the WiFi hardware in the PHY layer. Thus, the WiFi PHY layer may automatically generate a response as to whether a packet is received without further considerations (e.g., without verifying a reordering status). The indifferent approach by the WiFi PHY layer in responding to packet transmissions may lead to further consequences that negatively impact the WiFi connection.

In a second example and as an extension to the WiFi PHY layer automatically responding to packet transmissions, issues may arise when an access point (AP) of the WiFi network becomes leaky. For example, the WiFi AP may have design limitations and utilize a compromise mechanism. The WiFi coexistence time division duplex (TDD)/hybrid may utilize a WiFi power management mode to inform the WiFi AP to buffer packets. When the UE is in a WiFi sleep state, there are very few frames or packets that need to be buffered. However, in the WiFi coexistence switch state, a WiFi data transfer may be on-going and the UE may suddenly request that the WiFi AP buffer frames or packets. The WiFi AP may process this request in a manner substantially similar to a WiFi power management mode. However, the conditions between the WiFi power management mode and the WiFi coexistence switch state are entirely different. For example, a leaky AP may respond with an ACK yet continue to transmit data frames or packets to the UE for packets already queued for delivery. This example shows that it is very challenging to maintain WiFi TCP performance in, for example, the 2.4 GHz band with radios such as Bluetooth. This challenge may be even greater with other radios such as UWB operating in the 5 GHz band because these types of radios may support a bandwidth of up to 80 MHz (e.g., when supporting communication using the IEEE 802.11ac standards). In such a case, the AP may buffer up to four times the amount of data for a normal 20 MHz channel.

To accommodate the traffic to be exchanged between sender and receiver, TCP may utilize windows that define how much unacknowledged data that a sender may send. TCP may be configured to transmit a series of packets in sequence where a first packet is transmitted, and an ensuing second packet is then transmitted without having received a response as to whether the first packet was received. In view of this manner of transmitting packets, the TCP traffic may be transmitted in bulk with resolutions for missed packets being performed at a later time.

To determine the number of unacknowledged packets that may be transmitted at a given time, the windows may be defined by the sender and/or the receiver. In a first example, a window may be a receiver (or receive) window that is managed by the receiver. The receiver window may be provided to the sender so that the sender has knowledge about the amount of data that may be handled by the receiver. For example, the receiver window may announce the number of bytes that are still free in a receiver buffer. In a second example, a window may be a congestion window that is maintained by the sender. The congestion window may prevent the link between the sender and the receiver from becoming overloaded with excess TCP traffic. The sender may determine the congestion window by estimating the current congestion between the sender and the receiver.

The receiver window and the congestion window may impact how TCP may be used as well as a timing aspect for transmitting packets from the sender to the receiver. For example, when the receiver window and/or the congestion window is set to a relatively low value, the amount of data (e.g., unacknowledged packets) that may be transmitted for a duration of time may also be relatively low. In contrast, when the receiver window and/or the congestion window is set to a relatively high value, the amount of data that may be transmitted for the same duration of time may be increased. Thus, to efficiently utilize the WiFi connection using TCP, the sender and receiver may attempt to set the congestion window and the receiver window, respectively, to a highest, acceptable value.

Although the sender and the receiver may attempt to set the respective window to the highest value, there are instances, conditions, or states when the window is to be adjusted, sometimes to a lower value. For example, when a new TCP link has been established or a TCP retransmission timeout is detected, the TCP process may utilize a slow start. The slow start may be a preventative measure for congestion control to avoid transmitting excess data that the WiFi connection is incapable of handling. When in the slow start state, the congestion window may be set to a relatively low value and increase over time. When proceeding without issues, the congestion window may increase aggressively to eventually reach a desired higher value. However, when encountering a retransmission timeout, the congestion window may be reduced. Since the retransmission timeout may be considered a significant issue, the reduction may be drastic (e.g., congestion window is reduced by half). With lower congestion windows (e.g., during the slow start), TCP packets may go missing and this may trigger retransmission timeouts that may reset the slow start. A cyclical pattern may emerge with continued low values for the congestion window. As can be seen, the slow start is a critical state that affects TCP performance.

As noted above, the retransmission timeout may be a factor in adjusting the congestion window. TCP includes a retransmission mechanism where packets that are not received within a transmission time window (e.g., no response from the receiver) triggers a retransmission of the packet. A first retransmission mechanism may be a timer-based retransmission that may be used when an ACK is not received for a TCP packet within a retransmission timeout duration that is triggered by the sender (e.g., when the TCP packet is transmitted). The retransmission timeout duration may vary along with a round trip delay time. For example, the retransmission timeout duration may be set between 200 and 700 ms. TCP may consider a timer-based retransmission as a fairly major event. Thus, to address when this event occurs, the sender may react very cautiously by quickly reducing the data rate and initialize slow start again. For example, the congestion time window may be reduced by half.

A second retransmission mechanism may be a fast retransmission that may be used when a predetermined number of duplicate ACKs are received (e.g., 3 duplicate ACKs). As those skilled in the art will understand, the response from the receiver for received packets may include a header that indicates a next expected packet. The TCP algorithm is configured such that the header is increased to the next expected packet when the prior packets in the sequence have been received. When packets are received out of sequence and an ordering operation indicates that a packet is missing, the header is kept at a particular value to indicate the missing packet. Accordingly, packets in the sequence after the missing packet that are received trigger an ACK with the header for the missing packet. In this manner, the sender may determine that a duplicate ACK is received. When the predetermined duplicate ACKs are received, the sender may determine that there is a high likelihood that the indicated packet has not been received and the fast retransmission may be performed.

The fast retransmission may allow the sender to retransmit the missing packet prior to the retransmission timeout duration expiring. In this manner, the sender may perform a plurality of transmission attempts for the missing packet in an attempt to receive an ACK. When the ACK is received before the retransmission timeout duration expires, the timer-based retransmission may be avoided. The fast retransmission may improve TCP performance. However, when the fast retransmission is performed, there may be modifications to the congestion window. For example, the congestion window may be reduced in a manner similar to the reduction used in the timer-based retransmission (e.g., in half).

Although the fast retransmission may be implemented, there may be instances when the fast retransmission may not be used. For example, when a leaky WiFi AP continues to transmit a packet and also performs retransmissions of the packet (e.g., using the timer-based retransmission), the WiFi AP may continue to transmit packets in the sequence when the UE has received a grant to switch the radio to a different wireless connection. Prior to the switch, the UE may have successfully received one or more TCP packets. While switched away, a packet may still be transmitted and retransmitted. At a subsequent time, the UE may have received a grant to return to the WiFi network. The UE may then receive a next packet successfully (e.g., a packet next in the sequence after the missed packet). With the next packet being successfully received and a corresponding ACK being transmitted, the next packet may remain in a lower layer and not be delivered to a higher layer in view of the missing packet. In such a scenario, duplicate ACKs may not be capable of being sent within the retransmission timeout window for the purposes of fast retransmission. Instead, the sender may rely on the retransmission timeout which carries penalties for TCP and data transmissions. This issue also illustrates a consequence of TCP relying on a reordering operation that is performed in the lower layer.

The retransmission timeout duration may also affect the manner of modifying the congestion window. The congestion window may be increased aggressively so that a more efficient delivery of TCP packets may be performed (e.g., more packets in the same amount of time). However, when the retransmission timeout duration is relatively long, the increase of the congestion window may be extended over a longer duration of time, negatively impacting the ramp up of the congestion window. This issue also illustrates a consequence of a relatively long retransmission timeout duration.

To improve the manner in which the TCP may be used for the WiFi connection, the exemplary embodiments provide a plurality of mechanisms that may be implemented as preliminary settings for packet transmissions or ongoing settings while packets are being transmitted. According to a first mechanism, for the WiFi infra connection and/or the WiFi P2P connection, the UE may increase a tolerance for packets that have been successfully received by utilizing a post processing operation to determine whether the packet is to be retained rather than automatically dropping the packet. According to a second mechanism, for the WiFi P2P connection, settings used when a timer-based retransmission event occurs may be modified with a less aggressive approach. According to a third mechanism, for the WiFi infra connection, timing windows in which the WiFi infra connection is used for a plurality of UEs may be aligned to reduce or eliminate the coexistence case.

FIG. 1 shows an exemplary network arrangement 100 according to various exemplary embodiments described herein. The network arrangement 100 includes UEs 110-114 and a wireless charger 116. Those skilled in the art will understand that the UEs 110-114 may be any type of electronic component that is configured to communicate via a network or via a peer-to-peer connection, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate with one or more networks. In this example, the networks with which the UEs 110-114 may wirelessly communicate are a legacy radio access network (RAN) 120 (e.g., a 3G network, a WCDMA network, a UMTS network, etc.), a Long Term Evolution (LTE) RAN (LTE-RAN) 122, and a wireless local area network (WLAN) 124 (e.g., a WiFi network). As described herein, the WLAN 124 may be referred to as the WiFi network 124 interchangeably. It should be understood that the UEs 110-114 may also communicate with other types of networks (e.g., 5G networks, etc.). With regards to the exemplary embodiments, in a particular implementation, the UEs 110-114 may establish a connection with the WiFi network 124 via a WiFi AP 126 (e.g., a WiFi router, server, etc.). For example, each of the UEs 110-114 may have a WiFi chipset that is used to communicate with the WiFi network 124. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a peer-to-peer connection such as a WiFi P2P connection that utilizes WiFi technology for a direct connection between peers in the absence of a WiFi AP (e.g., WiFi Direct). Thus, if the UE 110 and the UE 112 are within a proximity of one another (e.g., within a distance in which the WiFi P2P connection may be used), the UE 110 and the UE 112 may exchange data. In another example, the UE 110 may communicate with the UE 114 using a short-range communication protocol such as BlueTooth. Thus, if the UE 110 and the UE 114 are within a proximity of one another (e.g., within a distance in which BlueTooth communications may be performed), the UE 110 and the UE 114 may exchange data. In a further example, the UE 110 may use the wireless charger 116 to recharge a battery of the UE 110.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. The legacy RAN 120 may be used for circuit switched calls. For example, the legacy RAN 120 may include a 2G network in which a Global System for Mobile Communications (GSM) is used or a 3G network in which a Universal Mobile Telecommunications System (UMTS) is used. The WiFi network 124 may include any type of wireless local area network (WiFi, Hot Spot, IEEE 802.11x networks, etc.).

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IMS 150. The IMS 150 may be generally described as an architecture for delivering multimedia services to the UEs 110-114 using the IP protocol such as VoLTE calls. The network arrangement 100 may further include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The exemplary embodiments are described with respect to the UE 110 modifying how TCP is used for the WiFi connection in accordance with the mechanisms described above and that are described in greater detail below. The UE 110 may utilize the mechanisms individually or in combination. The UE 110 may dynamically utilize each mechanism based on existing conditions being experienced or states as well as whether the WiFi infra connection or the WiFi P2P connection is being used.

Figure 2:
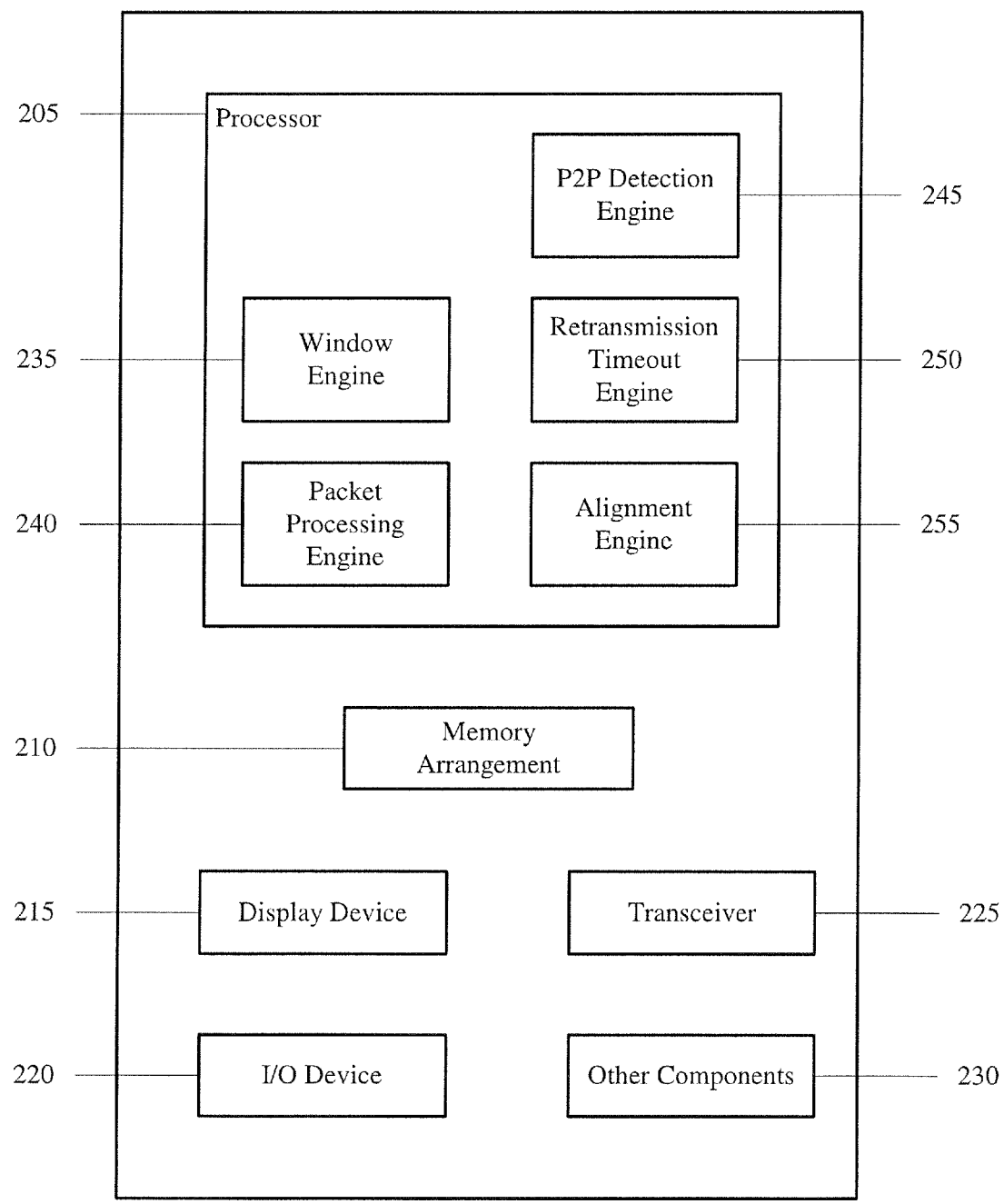
FIG. 2 shows an exemplary user equipment of the network arrangement of FIG. 1 according to various exemplary embodiments described herein.

FIG. 2 shows the UE 110 of the network arrangement 100 of FIG. 1 according to various exemplary embodiments described herein. The UE 110 is configured to execute a plurality of engines that implement the described mechanisms to improve TCP for the WiFi connection. The UE 110 may also represent the UEs 112, 114.

The UE 110 may represent any electronic device that is configured to connect to the WiFi AP 126 using a WiFi infra connection or to another one of the UEs 112, 114 using a WiFi P2P connection. The UE 110 may include a processor 205, a memory arrangement 210, a display device 215, an input/output (I/O) device 220, a transceiver 225, and other components 230. The other components 230 may include, for example, sensors to detect movement and movement related data, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a window engine 235, a packet processing engine 240, a P2P detection engine 245, a retransmission timeout engine 250, and an alignment engine 255. The window engine 235 and the packet processing engine 240 may be utilized with the first mechanism according to the exemplary embodiments. The P2P detection engine 245 and the retransmission timeout engine 250 may be utilized with the second mechanism according to the exemplary embodiments. The alignment engine 255 may be utilized with the third mechanism according to the exemplary embodiments.

The above described engines each being an application (e.g., a program) executed by the processor 205 is only exemplary. The engines may also be implemented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, in some UEs, the functionality described for the processor 205 is split among two or more processors such as a baseband processor and an applications processor, as will be described in further detail below. The exemplary embodiments may be implemented in any of these or other configurations of a UE.

The alignment engine 255 being incorporated in the UE 110 is only exemplary. The exemplary embodiments are described with regard to the UE 110 performing or participating in the third mechanism including various determinations being performed and the assignment of schedules. However, the third mechanism may also be performed at least partially or exclusively by the WiFi network 124. Thus, the third mechanism may be incorporated in the WiFi AP 126 and scheduling may be imparted to the UEs that are utilizing the WiFi infra connection.

The memory 210 may be a hardware component configured to store data related to operations performed by the UE 110. For example, the memory 210 may store packets that are successfully received, values associated with various settings, etc. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with at least one of a base station associated with the legacy RAN 120, a base station of the LTE-RAN 122 (e.g., an evolved Node B (eNB)), the WiFi AP 126 of the WiFi network 124, the UE 112, the UE 114, etc. Accordingly, the transceiver 225 may operate on a variety of different frequencies or channels (e.g., set of consecutive frequencies).

The first mechanism may be implemented for the WiFi infra connection or the WiFi P2P connection. The first mechanism may also be utilized while packets are being transmitted from a sender to a receiver. As will be described below, the first mechanism departs from conventional approaches that automatically discard packets when received outside an allowable time period.

In addition to the TCP windows described above, there may also be a WiFi MAC reordering window. For example, a size of the reordering window may be negotiated when the WiFi connection is established. Typically, the reordering window is a sliding, but fixed size window. In a particular implementation, the reordering window may indicate a predetermined number of packets that may be received in a given time period. Based on the negotiated size of the reordering window, the sender may adjust a transmission rate at which packets are transmitted to the receiver. Under conventional approaches, the receiver may receive packets from the sender and perform processing operations on the received packets within the reordering window. Although the reordering window may indicate a transmission rate that may maximize the available time period, there are various factors that may cause the packets to be delayed in reaching the receiver. For example, a routing path for the packet, interference issues, transmit power, etc. may cause a packet to reach the receiver outside the reordering window. The conventional approach only processes packets received within the reordering window while packets received outside the reordering window are dropped without any further consideration. The first mechanism increases the tolerance afforded to received TCP packets that fall outside the reordering window so that the WiFi connection may become more robust.

The window engine 235 and the packet processing engine 240 may implement the first mechanism according to the exemplary embodiments. For illustrative purposes, the UE 110 may be the receiver of packets while the WiFi AP 126 may be the sender of the packets. The first mechanism is described below with regard to the WiFi infra connection. However, the first mechanism may also be implemented for the WiFi P2P connection (e.g., where the UE 110 is the receiver and the UE 112 is the sender).

The window engine 235 may determine a size of the TCP receiver window and a size of the WiFi MAC reordering window. This information may then be transmitted to (or negotiated with) the WiFi AP 126. The window engine 235 may also monitor packets as they are being received by the UE 110 to determine whether a packet is received within or outside the reordering window. The packet processing engine 240 may process packets as they are being received by the UE 110. For example, based on an output from the window engine 235 as to whether the packet was received in the reordering window, the packet processing engine 240 may process the packet in a respective manner.

Figure 3:
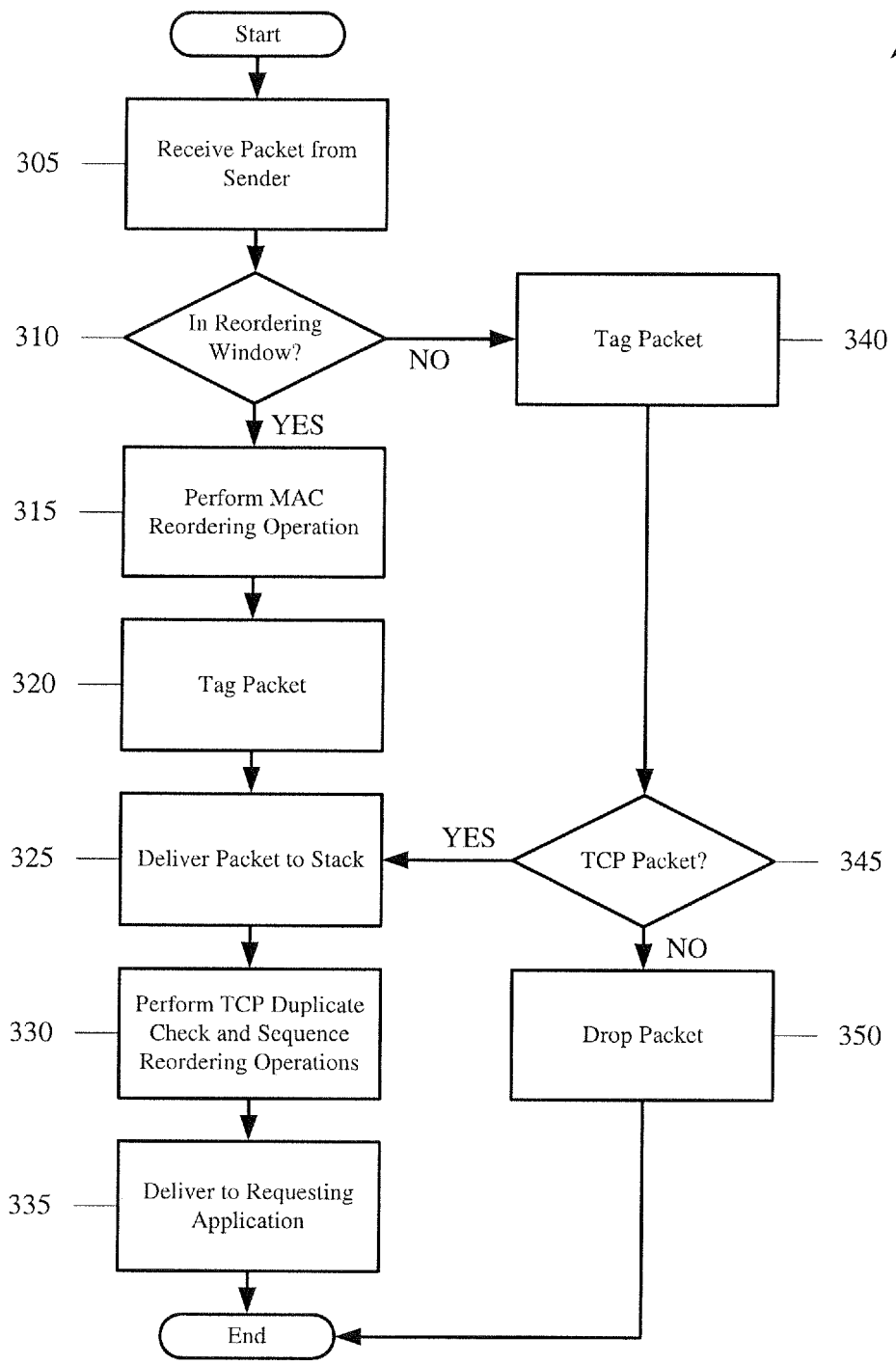
FIG. 3 shows an exemplary method to process received packets according to various exemplary embodiments described herein.

FIG. 3 shows an exemplary method 300 to process received packets according to various exemplary embodiments described herein. The method 300 relates to the first mechanism according to the exemplary embodiments while packets are being transmitted from a sender to a receiver. Again, the method 300 may be performed for the WiFi infra connection or the WiFi P2P connection. The method 300 may be performed by the window engine 235, the packet processing engine 240, and/or other components of the UE 110 that receives packets. The method 300 will be described with regard to the network arrangement 100 of FIG. 1 and the UE 110 of FIG. 2.

As noted above, the first mechanism including the engines 235, 240 as illustrated in the method 300 may be performed with one or more processors. In a corresponding manner, the first mechanism may also be performed at different networking layers as implemented by the UE 110. For example, those skilled in the art will understand that there may be a plurality of layers in the Open Systems Interconnection Model (OSI) such as a data link layer which incorporates a media access control (MAC), a host layer that exists at a higher level than the MAC (e.g., network and/or transport layer), and an applications layer that exists at a higher level than the host layer. When applied to the WiFi connection, the WiFi MAC layer may perform corresponding operations and the WiFi host may perform corresponding operations. The applications layer may include an application that requested data from the sender which was received in packets over the WiFi connection using TCP. The method 300 will further be described relative to the WiFi MAC layer, the WiFi host layer, and the requesting application.

As a preliminary matter, the method 300 may entail having determined when a reordering window is to be initiated to receive packets from the sender. Thus, prior to performing the method 300, the UE 110 may have determined the reordering window for packets to be received. As described above, the size of the reordering window may be negotiated between the receiver and the transmitter when the WiFi connection is established.

In 305, the UE 110 receives a packet from the WiFi AP 126 over the WiFi connection. For example, an application on the UE 110 (e.g., in the applications layer) may have requested data from a remote source. The UE 110 may have transmitted the request to the WiFi network via the WiFi AP 126. The WiFi network may have received the requested data and packetized the data as per the TCP process. A TCP packet may then be transmitted from the WiFi AP 126 to the UE 110 using the WiFi connection.

In 310, the UE 110 determines whether the packet is received in the reordering window. At the time the TCP packet is received, the reordering window may be open or may have expired. Although the TCP packet may have been transmitted with the intent of being received within the reordering window, various factors may interfere with the expected delivery time such that the TCP packet may or may not be received within the reordering window (e.g., signal fading, UE mobility, etc.). If the TCP packet was received within the reordering window, a first approach for processing the TCP packet may be performed.

The first approach to process the TCP packet received within the reordering window may start with 315, where the WiFi MAC of the UE 110 may perform a reordering operation. As those skilled in the art will understand, the WiFi MAC layer may perform an initial reordering operation since the packets may be received out of order or out of sequence. Once reordered, in 320, the WiFi MAC layer of the UE 110 may tag the TCP packet that is positioned in the appropriate location in the sequence of the packets corresponding to the data requested by the application. For example, the TCP packet may be tagged based on the reordering operation.

In 325, the UE 110 delivers the received TCP packet to a stack of an upper layer (e.g., the WiFi host layer). For example, the WiFi host layer may be directed to a TCP/IP stack that processes the received TCP packet. Thus, in 330, the TCP host layer in the TCP/IP stack performs processes for the received TCP packet. In a first example, the TCP host layer may perform a TCP duplicate check. As described above, the UE 110 may have received multiple copies of a given TCP packet because the TCP transmission process may result in a plurality of attempts to transmit a particular TCP packet. The TCP host layer may determine whether the received TCP packet is a duplicate of a TCP packet that was already received. The TCP host layer may perform any duplication check operation as is defined in the TCP/IP standard. In a second example, the TCP host layer may perform a sequence reordering operation. The sequence reordering operation may be substantially similar to the WiFi MAC layer reordering operation performed in 315. For example, the received TCP packet may be positioned in the appropriate location within the sequence of the packets for the requested data. Once the received TCP packet has been properly positioned with duplicates being omitted and the requested data being reassembled, in 335, the WiFi host layer of the UE 110 may deliver the data to the application layer. For example, the requesting application may receive the requested data.

Returning to 310, when a packet is received outside the reordering window, the method continues to 340. According to the first mechanism of the exemplary embodiments, a packet received outside the reordering window is given more tolerance. In 340, the WiFi MAC layer tags the packet in a manner substantially similar to the received TCP packet being tagged in 320.

Once tagged, the WiFi MAC layer delivers the received packet to the WiFi host layer. In 345, the WiFi host determines whether the packet received outside the reordering window is a TCP packet. Since the packet is received outside the reordering window, there is a possibility that the packet may not be a TCP packet. For example, the packet may be a user datagram protocol (UDP) packet. When the received packet is not a TCP packet, the UE 110 may continue to 350 where the received packet is dropped. However, if the received packet is a TCP packet, the UE 110 continues to 325 where the received TCP packet is delivered to the TCP/IP stack. Although the TCP packet received outside the reordering window was not processed with the reordering operation of the WiFi MAC layer, the WiFi host layer may perform the sequence reordering operation for the TCP packet to be properly positioned (e.g., in 330).

As described above, the first mechanism according to the exemplary embodiments provides increased tolerance for TCP packets that may arrive after a reordering window has closed. Thus, the WiFi MAC layer may now tag packets that are received outside the reordering window and not automatically drop such packets. The increased tolerance for these packets may also allow received TCP packets to be processed using the duplication check and the sequence reordering operations performed by the WiFi host layer, thereby maintaining the sequencing feature associated with the TCP process.

The second mechanism may be implemented for the WiFi P2P connection. The second mechanism may be utilized once packets have been transmitted from a sender to a receiver and a timer-based retransmission has resulted for at least one of the TCP packets. The WiFi P2P connection may utilize WiFi technology for two UEs to establish a direct connection without the WiFi AP 126. As illustrated in the network arrangement 100 of FIG. 1, the UE 110 may connect to the UE 112 with the WiFi P2P connection. Since there is no AP involved in a data transfer, there is no expected congestion between the UEs 110, 112 over the WiFi P2P connection. When a TCP packet is missing or is dropped when using the WiFi P2P connection, it is likely due to a wireless condition or due to a multiple radio coexistence case.

The P2P detection engine 245 and the retransmission timeout engine 250 may implement the second mechanism according to the exemplary embodiments. For illustrative purposes, the UE 110 may be the sender of packets while the UE 112 may be the receiver of the packets. Thus, the UEs 110, 112 may be the two end devices that are connected. The connection may be direct when using the WiFi P2P connection or indirect when using the WiFi infra connection via the WiFi AP 126.

The P2P detection engine 245 may identify the type of WiFi connection being used. For example, when a messaging feature is used to suspend WiFi traffic, the P2P detection engine 245 may identify that the WiFi infra connection is being used. In another example, an application may trigger a particular use of the WiFi P2P connection. The retransmission timeout engine 250 may track a retransmission timeout duration including when the retransmission timeout duration has been initiated or expired. The transmission timeout engine 250 may also determine settings to be used when a timer based retransmission event occurs based on the type of WiFi connection being used.

Figure 4:
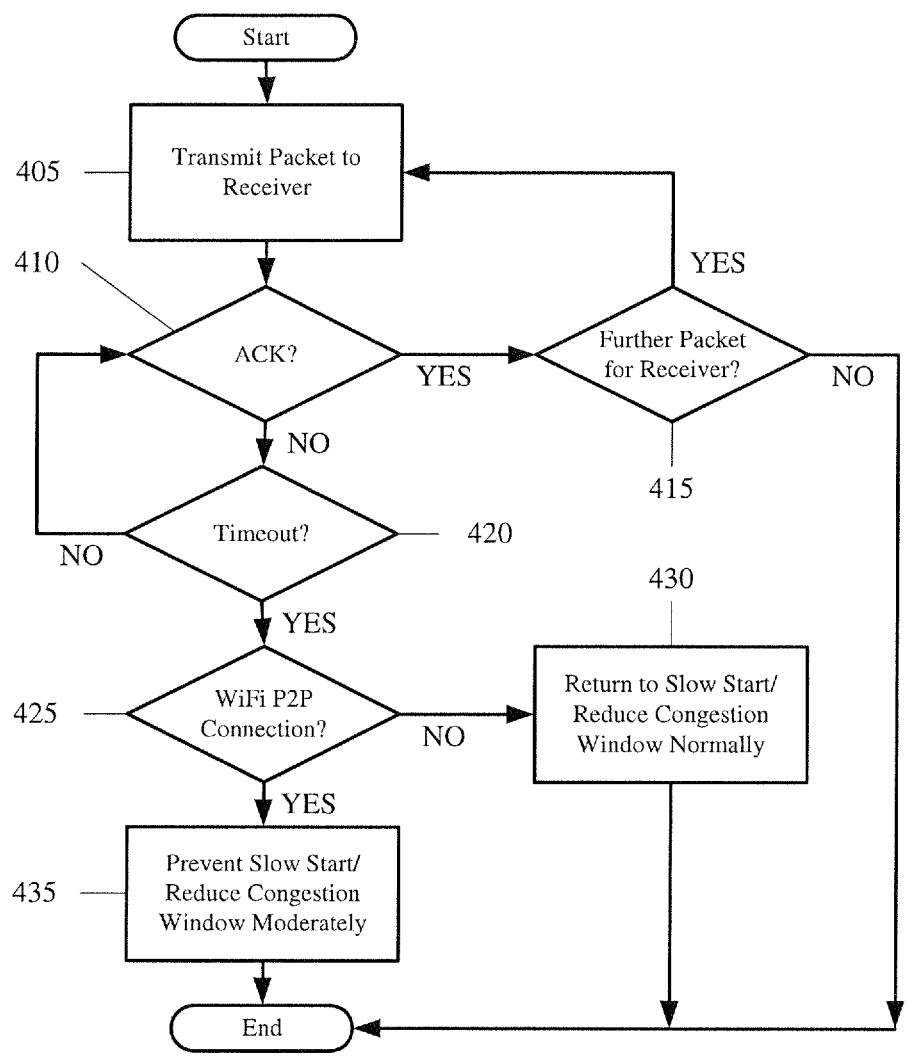
FIG. 4 shows an exemplary method to modify settings according to various exemplary embodiments described herein.

FIG. 4 shows an exemplary method 400 to modify settings according to various exemplary embodiments described herein. The method 400 relates to implementing the second mechanism to respond to when a timer-based retransmission is registered so that subsequent packet transmissions are performed with modified settings. The method 400 may be performed by the P2P detection engine 245, the retransmission timeout engine 250, and/or other components of the UE 110 that is a sender of the packets. The method 400 will be described with regard to the network arrangement 100 of FIG. 1 and the UE 110 of FIG. 2.

In 405, the UE 110 transmits a TCP packet to the UE 112. For example, an application on the UE 112 may have requested data from the UE 110 (e.g., an image). The UE 110 may have identified the requested data (e.g., stored in the memory arrangement 210), packetized the data as per the TCP process, and then transmit the TCP packet from the UE 110 to the UE 112.

In 410, the UE 110 determines whether an ACK is received in response to the TCP packet transmitted in 405.

As described above, TCP may utilize a timer-based retransmission when a retransmission timeout duration has expired. The retransmission timeout duration may be initiated, for example, at a time that the TCP packet was transmitted. While the retransmission timeout duration is running, the UE 110 may await a response from the receiver UE 112. If the UE 110 receives an ACK, the UE 110 may then, in 415, determine if there are any further packets. If more TCP packets are to be transmitted, the method returns to 405.

Returning to 410, if the UE 110 does not receive an ACK or receives a NACK, the method continues to 420. In 420, the UE 110 determines whether the retransmission timeout duration has expired. When the retransmission timeout duration has not expired, the method may return to 410 to wait for a response from the UE 112. Those skilled in the art will understand that the TCP process may enable a plurality of attempts to transmit a TCP packet within the retransmission timeout duration. Thus, even if the UE 110 receives a NACK, a subsequent ACK may still be received before the retransmission timeout duration expires. Thus, when returning to 410, the UE 110 may also be performing one or more retransmissions of the packet.

If the retransmission timeout duration has expired, the method continues to 425 where the UE 110 identifies the type of connection used to transmit the TOP packet from the UE 110 to the UE 112. For example, the UE 110 determines whether the connection to the UE 112 is a WiFi infra connection or a WiFi P2P connection. When the WiFi infra connection is used, the method continues to 430. When the WiFi P2P connection is used, the method continues to 435.

In 430, the expired retransmission timeout duration indicates that transmitting the TCP packet over the WiFi infra connection triggered a timer-based retransmission. TCP recognizes that the timer-based retransmission is a major event that requires attention. Accordingly, as defined in the TCP standard, the UE 110 may determine that there is a likelihood of congestion and apply a corresponding penalty. For example, the UE 110 (as the sender) may reduce the congestion window and also restart a slow start. For example, the congestion window may be reduced by half.

In 435, the expired retransmission timeout duration indicates that transmitting the TCP packet over the WiFi P2P connection triggered a timer-based retransmission. In contrast to the WiFi infra connection, there should be no congestion since there is no intermediary (e.g., the WiFi AP 126). The second mechanism according to the exemplary embodiments acknowledges that there is no congestion with the WiFi P2P connection. Therefore, the UE 110 maintains the current transmission state (e.g., transmission rate) and does not restart the slow start. The UE 110 also reduces the congestion window less aggressively to reduce a time needed to further ramp up. For example, the UE 110 may reduce the congestion window by ¼.

As described above, the second mechanism according to the exemplary embodiments determines modified settings to be used when a timer-based retransmission event is registered while transmitting TOP packets over a WiFi P2P connection. Thus, the sender of TCP packets in the WiFi P2P connection may utilize less aggressive settings than would be used for WiFi connections when the retransmission timeout expires, and congestion is assumed to be the cause. Without restarting a slow start and using a smaller reduction in the congestion window, the WiFi P2P connection may be used more efficiently with increased transmission rates, larger buffers, etc.

The third mechanism may be implemented for the WiFi infra connection. The third mechanism may also be utilized at any time that the WiFi infra connection is being used or will be used. As will be described below, the third mechanism may reduce coexistence issues that may arise from multiple UEs concurrently using different types of wireless connections and align use of the WiFi infra connection so that when the WiFi infra connection is being used, other types of wireless connections are not being used.

A coexistence case may arise, for example, when then UEs 110, 112, 114 may be using a WiFi connection, a cellular connection, a BlueTooth connection, etc. within a proximity of one another. As described in detail above, various coexistence cases arise from a combination of these types of wireless connections which may result in the WiFi connection being temporarily suspended. Thus, eliminating or minimizing the coexistence case so that the number of different types of wireless connections that are being used at a time may lead to improved use of the TCP to transmit data.

The alignment engine 255 may implement the third mechanism according to the exemplary embodiments. For illustrative purposes, the UEs 110-114 may each be using a respective WiFi infra connection with the WiFi AP 126. Thus, the UE 110 may be connected to the WiFi AP 126 with a first WiFi infra connection, the UE 112 may be connected to the WiFi AP 125 with a second WiFi infra connection, and the UE 114 may be connected to the WiFi AP 125 with a third WiFi infra connection. As illustrated in the network arrangement 100 of FIG. 1, the UE 110 may also establish a direct connection with the UE 112 using a WiFi P2P connection. The UE 110 may further establish a direct connection with the UE 114 using a BlueTooth connection.

The alignment engine 255 may determine a schedule of a plurality of UEs to use a respective WiFi infra connection. For example, the alignment engine 255 may generate a master schedule for multiple UEs to use the WiFi infra connections. Through a coordinated mechanism so that the WiFi infra connection is used by each of the UEs at the same time, for example, based on a TDD, the coexistence case may be reduced to decrease issues that may arise (e.g., decreasing times for a temporary suspension of the WiFi connection).

Figure 5:
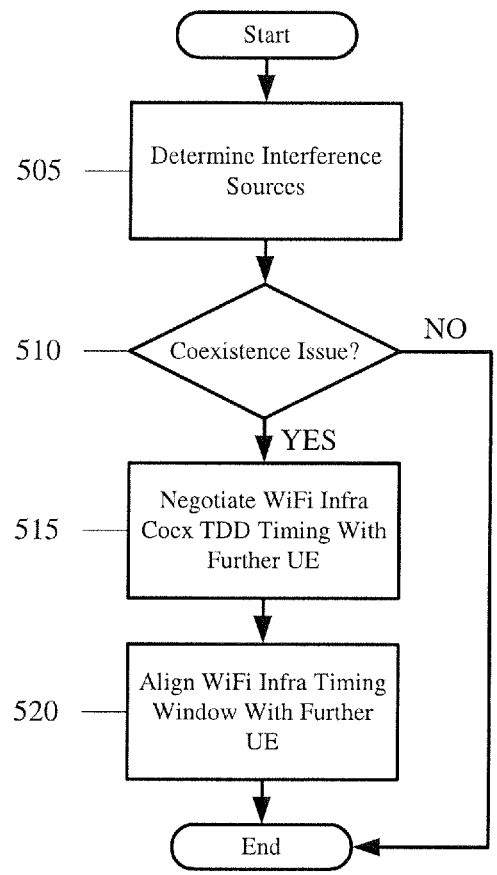
FIG. 5 shows an exemplary method for aligning timing windows according to various exemplary embodiments described herein.

FIG. 5 shows an exemplary method 500 for aligning timing windows according to various exemplary embodiments described herein. The method 500 relates to the third mechanism to align periods in which the UEs 110-114 utilize the WiFi infra connection with the WiFi AP 126. Again, the method 500 may be performed for the WiFi infra connection. The method 500 may be performed by the alignment engine 255 and/or other components of the UE 110 that aligns the periods for the UEs. The method 500 will be described with regard to the network arrangement 100 of FIG. 1 and the UE 110 of FIG. 2.

Initially, the method 500 being performed by the UE 110 is only exemplary. In another exemplary embodiment, the WiFi AP 126 may include the alignment engine 255. Thus, the WiFi AP 126 may coordinate the alignment of the periods in which the UEs are to use the WiFi infra connection.

A communication between the UEs 110-114 to align the periods may be performed in a variety of ways. When one of the UEs performs the third mechanism, the UEs may communicate with one another directly (e.g., the WiFi P2P connection, a BlueTooth connection, etc.) or indirectly (e.g., via the WiFi AP 126). When the WiFi AP 126 performs the third mechanism, the WiFi AP 126 may communicate the schedule via the respective WiFi infra connections. For illustrative purposes, the exemplary embodiments will be described for the UEs 110, 114 and coordination may be performed using the BlueTooth connection. However, those skilled in the art will understand that the method 500 may also be used with more than two UEs and using any communication pathway for the coordination (e.g., WiFi P2P connection).

In 505, the UE 110 determines whether there are interference sources such that the third mechanism according to the exemplary embodiments may be used. For example, there may be no other types of wireless connections that are in use by either of the UEs 110, 114. In another example, there may be at least one other type of wireless connection that may give rise to a coexistence case. Thus, in 510, if there is no coexistence case, the UE 110 may end the method 500.

If there is an actual or potential coexistence case, the method continues to 515. In 515, the UE 110 may negotiate with the UE 114 so that the master schedule for using the respective WiFi infra connections may be generated. For example, the UE 110 may request information about the different wireless connections that are being used by the UE 114. After determining the wireless connections being used by the UE 110, the UE 110 may determine the master schedule that aligns the periods in which the WiFi infra connections may be used concurrently between the UE 110 and the UE 114. The UEs 110, 114 may each have an individual schedule in which to use the various wireless connections. Since the master schedule is specifically for the WiFi infra connections, the master schedule may track the WiFi infra connections while periods between the WiFi infra connections may be set generally for other wireless connections. Thus, in 520, the WiFi infra connection timing between the UEs 110, 114 may be aligned.

As described above, the third mechanism aligns periods in which WiFi infra connections may be used by a plurality of UEs such that the periods coincide, e.g., when the WiFi infra connection is used by a first UE, other WiFi infra connections are being used by a second UE. In this manner, a coexistence case in which other wireless connections (e.g., cellular, BlueTooth, WiFi P2P, etc.) are used while the WiFi infra connection may be reduced or eliminated. With less of a coexistence case, issues arising from the coexistence case being present may also be reduced or eliminated.

The exemplary embodiments are described above in an individual capacity. However, the first, second, and third mechanisms may be used individually or in combination (e.g., two mechanisms or all three mechanisms). For example, all three mechanisms may be implemented for the WiFi network 124. Prior to use of the WiFi infra connections, the UEs 110-114 may utilize the third mechanism so that periods of use for the WiFi infra connections are aligned with one another. When any WiFi P2P connection is in use, the UEs 110-114 may utilize the second mechanism so that this connection is used more efficiently. While TCP packets are being transmitted using the WiFi connections, the UEs 110-114 may utilize the first mechanism for greater tolerance in received TCP packets. Thus, the mechanisms according to the exemplary embodiments may be used individually or in a combination.

In using the above mechanisms according to the exemplary embodiments, the TCP used in transmitting data over a wireless WiFi network may be improved in various ways. For example, for a downlink performance using TCP with a coexistence case, conventional approaches may generate a throughput of about 20 Mbps with a TCP stall duration of about 30%. However, instituting at least one of the mechanisms of the exemplary embodiments may increase the TCP throughput. For example, a throughput of about 40 Mbps may be observed. As the mechanisms may avoid the TCP stall, a slope or data rate for data transfers using TCP may be improved, especially since data stalls may disable WiFi aggregation.

The exemplary embodiments provide a device, system, and method of improving TCP performance in WiFi coexistence cases. By modifying manners in which data transmissions using TCP are performed, the TCP performance may be improved prior to TOP packets being transmitted, while TCP packets are being transmitted, and after TCP packets have been transmitted that result in a timer-based retransmission to be used. In a first mechanism, an increased tolerance may be provided to received TCP packets using a post processing operation rather than automatically dropping packets that are received outside a reordering window. In a second mechanism, modified settings may be used when a WiFi P2P connection is used when a retransmission timeout duration expires. In a third mechanism, periods of using WiFi infra connections by a plurality of UEs may be aligned to reduce the coexistence case.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users It will be apparent to those skilled in the art that various modifications may be made to the present disclosure, without departing from the spirit or the scope of the exemplary embodiments. Thus, it is intended that the present disclosure cover modifications and variations of the exemplary embodiments provided they come within the scope of the appended claims and their equivalent.

What is claimed is:

1. A method, comprising:
at a first device configured to establish a wireless connection with a second device:
transmitting a transmission control protocol (TCP) packet to the second device;
determining whether a retransmission timeout duration for the TCP packet has expired;
when the retransmission timeout duration has expired, determining a type of the wireless connection;
when the wireless connection comprises a WiFi infrastructure connection, selecting first settings including restarting a slow start and reducing a congestion window by a first amount, the congestion window being set by the first device to define a data rate based on congestion in the wireless connection; and
when the wireless connection comprises a WiFi peer-to-peer (P2P) connection, selecting second settings including reducing a congestion window by a second amount that is less than the first amount, and omitting a restart of the slow start.

2. The method of claim 1, wherein, when the wireless connection comprises the WiFi infrastructure connection, the second device comprises an access point of a WiFi network.

3. The method of claim 1, wherein, when the wireless connection comprises the WiFi P2P connection, the first device is directly connected to the second device without an intervening gateway.

4. The method of claim 1, wherein the retransmission timeout duration triggers a timer-based retransmission of the TCP packet.

5. The method of claim 1, wherein the second amount is one-half of the first amount.

6. The method of claim 1, wherein the omitting the restart of the slow start comprises maintaining a current transmission rate.

7. A first device, comprising:
a transceiver configured to establish a wireless connection with a second device; and
a processor communicatively coupled to the transceiver and configured to perform operations comprising:
transmitting a transmission control protocol (TCP) packet to the second device;
determining whether a retransmission timeout duration for the TCP packet has expired;
when the retransmission timeout duration has expired, determining a type of the wireless connection;
when the wireless connection comprises a WiFi infrastructure connection, selecting first settings including restarting a slow start and reducing a congestion window by a first amount, the congestion window being set by the first device to define a data rate based on congestion in the wireless connection; and
when the wireless connection comprises a WiFi peer-to-peer (P2P) connection, selecting second settings including reducing a congestion window by a second amount that is less than the first amount, and omitting a restart of the slow start.

8. The first device of claim 7, wherein, when the wireless connection comprises the WiFi infrastructure connection, the second device comprises an access point of a WiFi network.

9. The first device of claim 7, wherein, when the wireless connection comprises the WiFi P2P connection, the first device is directly connected to the second device without an intervening gateway.

10. The first device of claim 7, wherein the retransmission timeout duration triggers a timer-based retransmission of the TCP packet.

11. The first device of claim 7, wherein the second amount is one-half of the first amount.

12. The first device of claim 7, wherein the first amount is one-half of a current amount for the congestion window.

13. The first device of claim 7, wherein the omitting the restart of the slow start comprises maintaining a current transmission rate.

14. A processor of a first device configured to perform operations comprising:
transmitting a transmission control protocol (TCP) packet to a second device;
determining whether a retransmission timeout duration for the TCP packet has expired;
when the retransmission timeout duration has expired, determining a type of the wireless connection;

when the wireless connection comprises a WiFi infrastructure connection, selecting first settings including restarting a slow start and reducing a congestion window by a first amount, the congestion window being set by the first device to define a data rate based on congestion in the wireless connection; and when the wireless connection comprises a WiFi peer-to-peer (P2P) connection, selecting second settings including reducing a congestion window by a second amount that is less than the first amount, and omitting a restart of the slow start.

15. The processor of claim 14, wherein, when the wireless connection comprises the WiFi infrastructure connection, the second device comprises an access point of a WiFi network.

16. The processor of claim 14, wherein, when the wireless connection comprises the WiFi P2P connection, the first device is directly connected to the second device without an intervening gateway.

17. The processor of claim 14, wherein the retransmission timeout duration triggers a timer-based retransmission of the TCP packet.

18. The processor of claim 14, wherein the second amount is one-half of the first amount.

19. The processor of claim 14, wherein the first amount is one-half of a current amount for the congestion window.

20. The processor of claim 14, wherein the omitting the restart of the slow start comprises maintaining a current transmission rate.

* * * * *